(12) United States Patent
Fishcer et al.

(10) Patent No.: US 8,608,482 B2
(45) Date of Patent: Dec. 17, 2013

(54) SYSTEM AND RELATED METHOD FOR INSTRUCTING PRACTITIONERS RELATIVE TO APPROPRIATE MAGNITUDE OF APPLIED PRESSURE FOR DENTAL PROCEDURES

(75) Inventors: Dan E. Fishcer, Sandy, UT (US); Luis Gustavo de Mattos Abreu, Indaiatuba (BR)

(73) Assignee: Ultradent Products, Inc., South Jordan, UT (US)

( * ) Notice: Subject to any disclaimer, the term of this patent is extended or adjusted under 35 U.S.C. 154(b) by 303 days.

(21) Appl. No.: 13/184,051

(22) Filed: Jul. 15, 2011

(65) Prior Publication Data

US 2012/0021396 A1    Jan. 26, 2012

Related U.S. Application Data

(60) Provisional application No. 61/366,289, filed on Jul. 21, 2010.

(51) Int. Cl.
    *G09B 23/28* (2006.01)
(52) U.S. Cl.
    USPC ............................ 434/263; 434/267; 434/272
(58) Field of Classification Search
    USPC ......................... 434/263, 267, 272
    See application file for complete search history.

(56) References Cited

U.S. PATENT DOCUMENTS

| | | | |
|---|---|---|---|
| 3,646,680 A | | 3/1972 | Wollney et al. |
| 5,186,624 A | * | 2/1993 | Gottsleben ..................... 433/69 |
| 5,688,118 A | | 11/1997 | Hayka et al. |
| 5,813,083 A | | 9/1998 | Gould |
| 6,786,732 B2 | | 9/2004 | Savill et al. |
| 7,249,952 B2 | | 7/2007 | Ranta et al. |
| 2004/0091845 A1 | | 5/2004 | Azerad et al. |
| 2005/0089706 A1 | * | 4/2005 | Urata et al. ................... 428/546 |
| 2006/0019228 A1 | | 1/2006 | Riener et al. |
| 2009/0098193 A1 | * | 4/2009 | Cochrum et al. ............. 424/445 |

FOREIGN PATENT DOCUMENTS

WO    WO0237453    5/2002

OTHER PUBLICATIONS

U.S. Appl. No. 61/366,289, filed Jul. 21, 2010, Fischer et al.

* cited by examiner

*Primary Examiner* — Benjamin Layno
(74) *Attorney, Agent, or Firm* — Workman Nydegger

(57) ABSTRACT

System and method for teaching a dental practitioner an appropriate pressure to apply during a dental procedure. The system includes a dental tool for use in a dental procedure and a substrate including a coating of a removable scratch-off material. The scratch-off material is adhered to the substrate so as to have an adherence strength that is specifically configured so that the scratch-off material coating is removable from the substrate by manipulating the dental tool against the scratch-off material coating upon application of a minimum threshold pressure that is substantially equal to that to be applied during a selected actual dental procedure. In this manner, an inexperienced practitioner is able to learn the appropriate magnitude of pressure to be applied during a procedure (e.g., application and burnishing of a hemostatic composition into bleeding soft tissue) in a non-threatening environment without having to actually work on a live, bleeding patient.

20 Claims, 4 Drawing Sheets ial to that required during an actual dental procedure in order to be effective. In this manner, an inexperienced practitioner is able to learn the appropriate magnitude of pressure to be applied during a hemostatic application and burnishing procedure in a non-threatening environment without having to actually work on actual live, bleeding tissue of a patient.

These and other benefits, advantages and features of the present invention will become more fully apparent from the following description and appended claims, or may be learned by the practice of the invention as set forth hereinafter.

SYSTEM AND RELATED METHOD FOR INSTRUCTING PRACTITIONERS RELATIVE TO APPROPRIATE MAGNITUDE OF APPLIED PRESSURE FOR DENTAL PROCEDURES

CROSS-REFEREENCE TO RELATED APPLICATIONS

This application claims the benefit of U.S. Provisional Application No. 61/366,289, filed Jul. 21, 2010, the disclosure of which is incorporated herein in its entirety.

BACKGROUND OF THE INVENTION

1. The Field of the Invention

The present invention is in the field of dentistry, more particularly in the field of systems and methods used in instructing dental practitioners.

2. The Relevant Technology

In some dental procedures, it is necessary to apply a minimum threshold level of pressure while manipulating the dental tool against a selected tissue surface. For example, in many dental procedures, it is desirable to control and/or arrest bleeding in adjacent soft tissues so as to minimize patient discomfort and prevent excess blood from obstructing the practitioner's view of the site. A hemostatic composition may be delivered through a dental tool with a delivery tip that is specially configured for this purpose. In order for the hemostatic composition to quickly and efficiently arrest bleeding, it is important that the practitioner apply pressure to the soft tissue while dispensing the composition and simultaneously manipulating the tissue (e.g., with a generally circular burnishing motion) with the tool delivery tip. If the applied pressure is too little in magnitude, the hemostatic composition will be ineffective in arresting bleeding. If the applied pressure is too great in magnitude, this can be unnecessarily uncomfortable for the patient, and may further injure the soft tissues. Knowing the appropriate magnitude of pressure to apply is something that is typically learned by experience, through trial and error. It can be difficult to teach a less experienced practitioner as to the appropriate level of applied pressure without actual practice and without damaging actual tissue of an individual.

SUMMARY OF THE INVENTION

The present invention provides a system and related method for teaching a dental practitioner an appropriate force or pressure to apply during a dental procedure employing a dental tool (e.g., a dispensing and burnishing tool used in application and manipulation of a hemostatic composition). The system includes a dental tool for use in a dental procedure (e.g., a dispensing and burnishing tool for delivering and simultaneously manipulating a hemostatic composition onto soft tissue) and a substrate including a coating of a removable scratch-off material.

The scratch-off material is adhered to the substrate (e.g., a paper substrate) so as to have an adherence strength that is specifically configured so that the scratch-off material coating is removable from the substrate by manipulating the dental tool against the scratch-off material coating upon application of a minimum threshold pressure that is substantially equal to that to be applied during a selected actual dental procedure. In other words, the minimum threshold pressure required to remove the scratch-off coating when manipulating the dental tool against the scratch-off material is substan-

BRIEF DESCRIPTION OF THE DRAWINGS

In order that the manner in which the above recited and other benefits, advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings, in which.

DETAILED DESCRIPTION OF THE PREFERRED EMBODIMENTS

I. Introduction

According to one embodiment, the disclosed teaching system includes a substrate including a coating of removable scratch-off material and dental tool, such as one used for delivering and manipulating (e.g., by burnishing) a hemostatic composition into bleeding soft tissue. The scratch-off material is adhered to the paper or other material substrate so as to have an adherence strength that is specifically configured so that a minimum threshold pressure required to remove the scratch-off material coating is substantially equal to that to be applied during a selected actual dental procedure that is the subject of the teaching system. By practicing the appropriate motion and pressure on the scratch-off material coating, an inexperienced practitioner is able to learn by practice the appropriate magnitude of pressure to be applied during a hemostatic burnishing procedure without having to actually work on a live, bleeding patient who may already be somewhat uncomfortable.

II. Exemplary Systems and Methods

Figure 1:
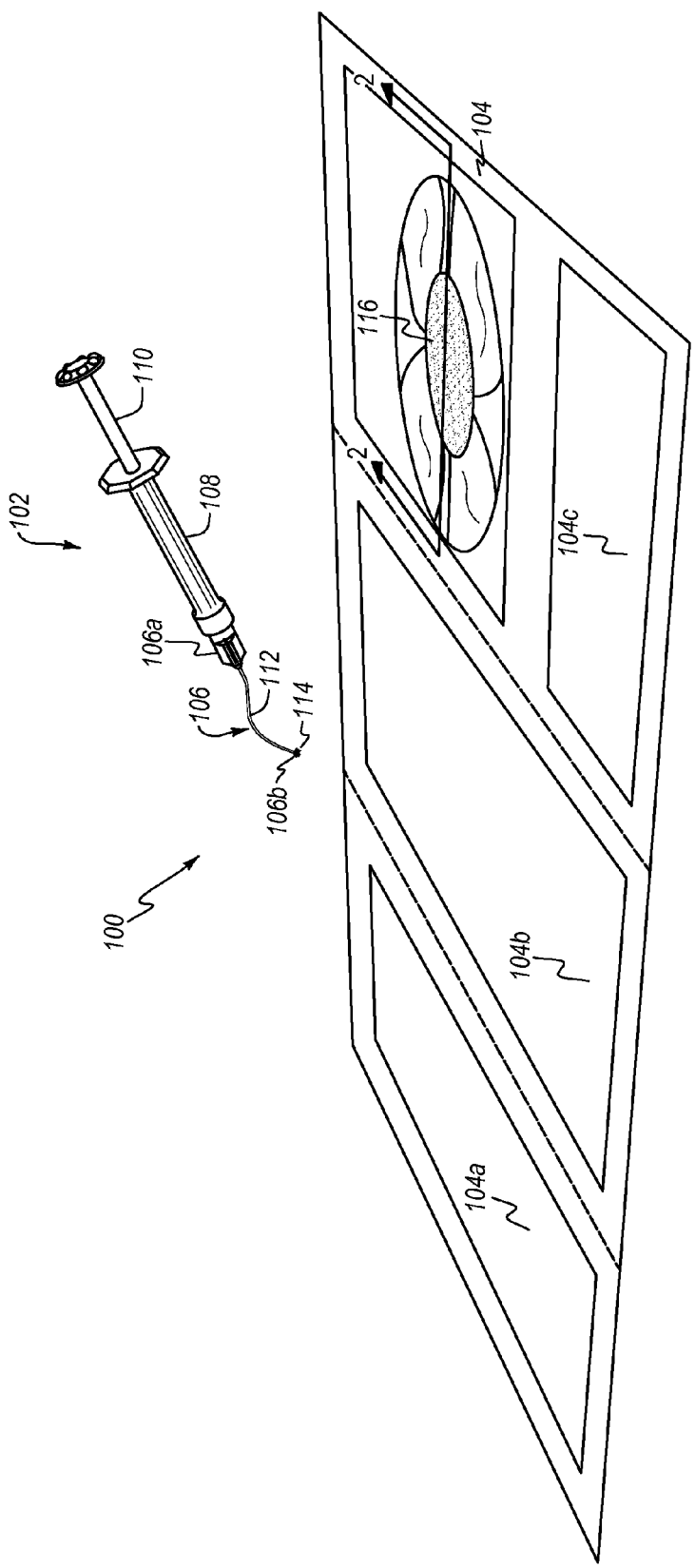
FIG. 1 is a perspective view of an exemplary teaching system including a dental tool and an exemplary substrate.

FIG. 1 shows a perspective view of an exemplary teaching system 100 including a dental tool 102 and a substrate 104. In one example, dental tool 102 may comprise a tool specially configured for delivering a hemostatic composition into bleeding soft tissue of a dental patient, while also providing the ability to manipulate and/or burnish (e.g., by forcefully pressing the tool against the substrate while manipulating the tip in a generally circular motion) the composition onto the tissue as it is dispensed through delivery tip 106. Tool 102 may include a syringe barrel 108 (e.g., for containing a hemostatic or other dental composition to be dispensed), a plunger 110 slidably received within syringe barrel 108 so as to selectively dispense the contents of barrel 108, and a delivery tip 106 coupled to the distal end of syringe barrel 108. Delivery tip 106 may include a thin metal cannula 112 extending from the proximal end 106a of tip 106, which is configured to couple with the distal end of syringe barrel 108, towards a distal orifice 106b through which the hemostatic or other composition is dispensed. The plunger, syringe barrel, and proximal end 106a of tip 106 may be formed of suitable polymeric materials. Metal cannula 112 may be relatively thin and angled as shown to aid in positioning and dispensing the composition to a relatively small area, which may otherwise be difficult to reach. Distal orifice 106b may include fibers and/or bristles 114 extending from and/or adjacent to distal orifice 106b so as to aid in manipulating and/or burnishing the hemostatic composition onto soft tissue during use. One such dental tool for delivery and burnishing of a hemostatic composition onto soft tissue is available from Ultradent Products, Inc., based in South Jordan, Utah under the name METAL DENTO-INFUSOR TIP. Such tools may be used to dispense various hemostatic or other dental compositions, examples of which include VISCOSTAT, VISCOSTAT CLEAR, VISCOSTAT WINTERMINT, and ASTRINGIDENT X, also available from Ultradent Products, Inc.

Subtrate 104 is illustrated in FIG. 1 as being in the form of a tri-fold brochure, although the substrate 104 may be of any configuration desired (e.g., a card, a brochure, a page of a pamphlet or book). By way of example, illustrated substrate 104 includes portions 104a, 104b and 104c, within which various information relating to the dental procedure that is the subject of teaching system 100 may be provided. As shown, a portion of substrate 104 (e.g., within portion 104c) advantageously includes a coating of a scratch-off material 116 adhered to substrate 104. Substrate 104 may comprise any suitable material to which the scratch-off material may be adhered so as to have an adherence strength as described herein. As shown, scratch-off material 116 may be disposed so as to cover only a portion of substrate 104, e.g., laid out in a generally circular shape. Of course, other shapes may be formed by the scratch-off material coating 116.

One particularly preferred substrate material is paper, although other materials (e.g., plastics, metal, etc.) may also be suitable so long as the adherence strength of the scratch-off material may be configured so as to be removed upon application of a minimum threshold pressure by the tool 102 (e.g., while manipulating burnishing tool 102 in a generally circular motion). Advantageously, the minimum threshold pressure required for removal is substantially equal to the pressure to be applied during the hemostat application and burnishing dental procedure that is the subject of teaching system 100.

Figure 2:
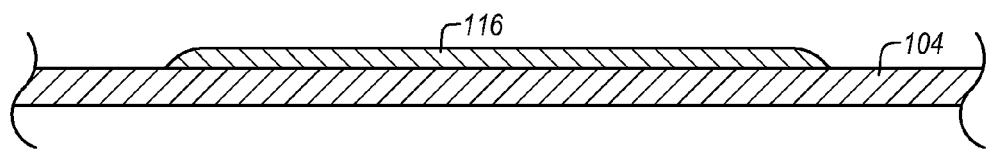
FIG. 2 is a cross-sectional view of the substrate of FIG. 1 taken along lines 2-2 schematically showing the scratch-off material coating adhered over a portion of the substrate.

FIG. 2 shows a cross-sectional view of the portion of substrate 104 including scratch-off material 116, which is adhered to substrate 104. The adherence strength of the scratch-off material 116 is affected by a plurality of variables, including the thickness of coating 116 and the characteristics of underlying substrate 104. For example, as the thickness of the scratch-off material increases, additional pressure is required in order to effect its removal from substrate 104 by pressing and manipulating with tool 102. Depending on the actual finished thickness of coating 116, the coating 116 may be applied as a series of multiple layers one over another until the desired thickness is achieved. Although coating 116 may be of any desired thickness, in one embodiment the thickness may range between about 0.01 mm and about 1 mm, more typically between about 0.02 mm and about 0.5 mm, and most typically between about 0.03 mm and about 0.1 mm.

In addition, where substrate 104 is relatively porous, the adhesion strength of the scratch-off material coating layer 116 is increased as compared to where substrate is more smooth. These variables may be adjusted to provide a substrate and scratch-off material coating where the pressure and manipulation required to remove the coating 116 under conditions simulating use of tool 102 (e.g., by pressing and simultaneously manipulating tool 102 in a generally circular path) are substantially identical to the conditions required during application of a hemostatic composition so as to arrest bleeding within soft tissue.

In one embodiment, the substrate includes a glossy coating (e.g., formed by applying an aqueous wash or coating to the paper as will be known to those of skill in the paper and printing arts), which reduces otherwise rough or porous characteristics of the substrate surface. This results in a substantially smooth substrate surface onto which the scratch-of material coating may be applied (e.g., by printing a latex scratch-off coating as will be known to those skilled in the paper and printing arts). Exemplary scratch-off material coatings include conventional scratch-off silver ink, conventional scratch-off gold ink, and other colors (e.g., red, blue, green, etc.) of conventional scratch-off inks. According to one embodiment, the scratch-off inks may be latex based.

Figure 3:
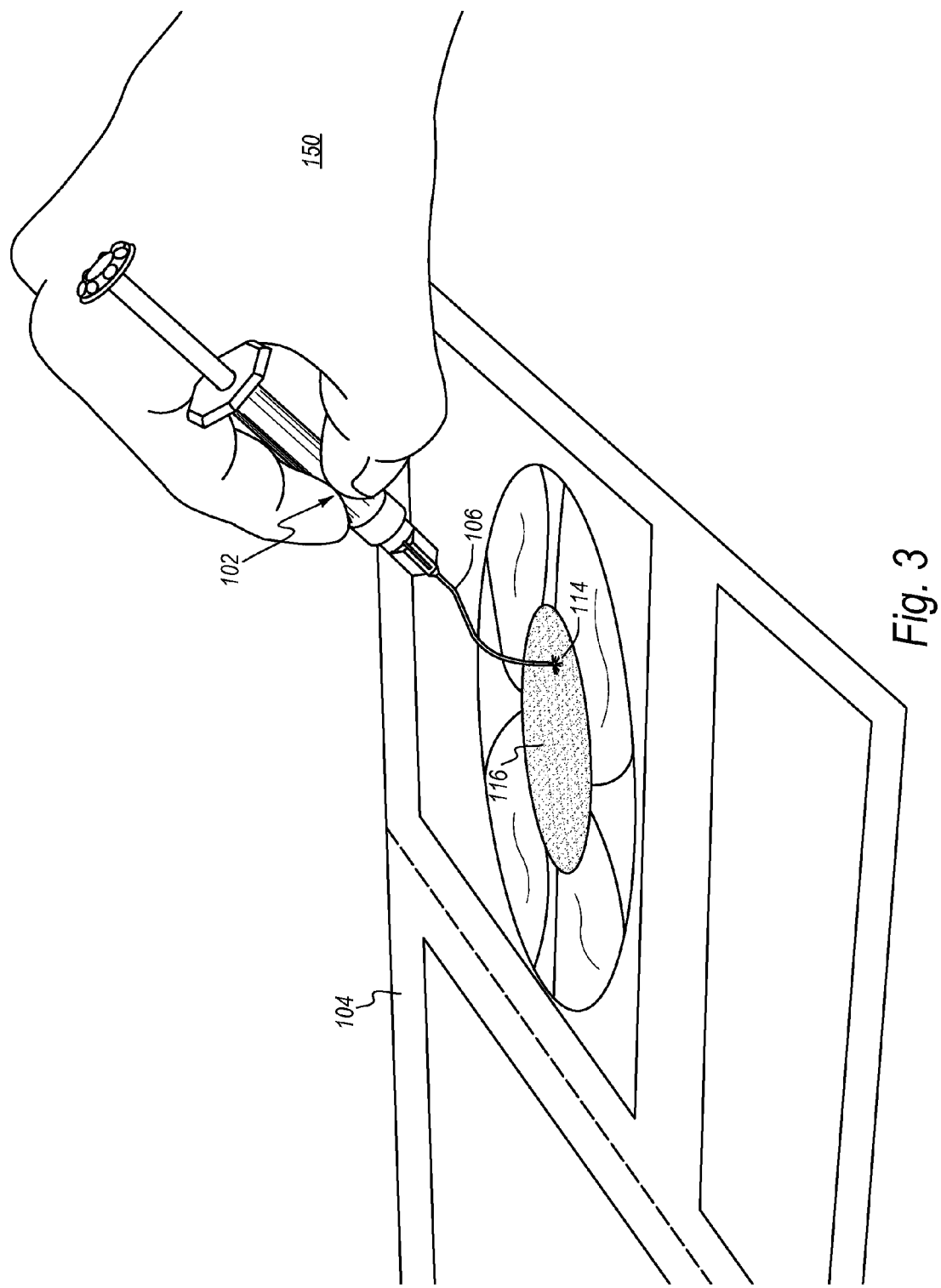
FIG. 3 is a perspective view of a practitioner holding the dental tool of the system of FIG. 1 and contacting the distal burnishing tip of the dental tool against the scratch-off material coating adhered over a portion of the substrate.
Figure 4:
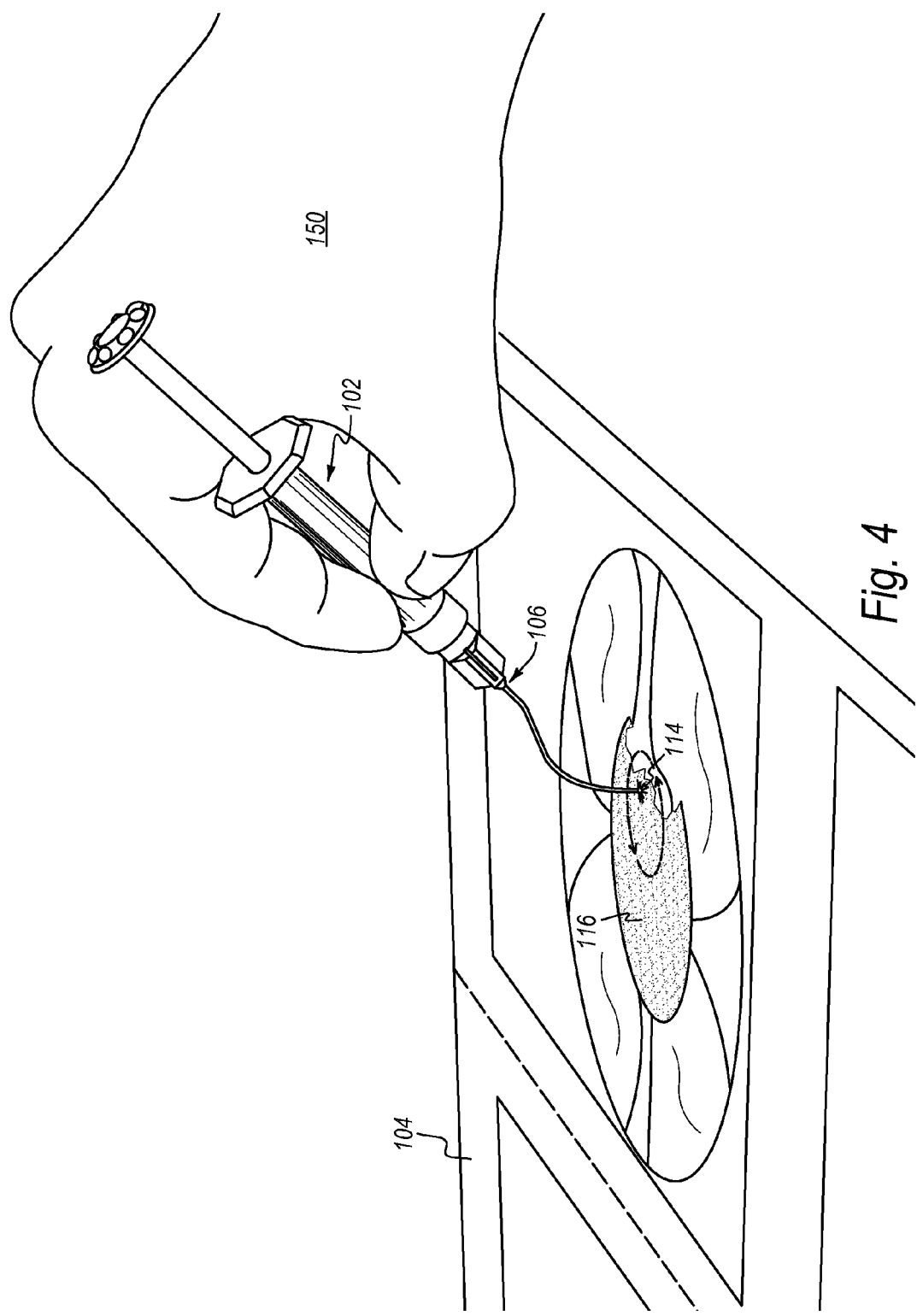
FIG. 4 is a perspective view of a practitioner manipulating the dental tool in a generally circular burnishing motion against the scratch-off coating while simultaneously applying sufficient pressure so as to cause the scratch-off material to be removed from the underlying substrate.

FIGS. 3 and 4 illustrate an exemplary method according to the present invention in which an inexperienced practitioner 150 holds the dental tool 102 within his or her hand, and practices burnishing a hemostatic agent while simultaneously applying sufficiently firm pressure against the sulcus so as to arrest bleeding. Where the pressure applied during the burnishing movement is insufficient to arrest bleeding, the scratch-off coating 116 will remain substantially intact, without being removed as a result of the pressure and generally circular motion of tool 102. Once the applied pressure reaches a minimum threshold that is substantially equal to that required to arrest bleeding, the scratch-off material coating 116 begins to be removed, as shown in FIG. 4. Using the inventive instructive system 100, the inexperienced practitioner is able to experience the appropriate magnitude of pressure to be applied during manipulation of the tool during the actual dental procedure, without having to practice on a live, bleeding patient.

It will also be appreciated that the present claimed invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A system for instructing a dental practitioner relative to an appropriate magnitude of pressure to be applied during a dental procedure, the system, comprising:
   a dental tool for use during a dental procedure; and
   a substrate including a coating of scratch-off material adhered to at least a portion of the substrate, the scratch-off material having an adherence strength to the substrate that is configured so that the scratch-off material is removable from the substrate using the dental tool upon application of a threshold minimum pressure that is substantially equal to a predetermined pressure to be applied during a selected actual dental procedure.

2. A system as recited in claim 1 wherein the coating of scratch-off material comprises a latex based scratch-off ink.

3. A system as recited in claim 2 wherein coating of scratch-off material comprises conventional scratch-off silver ink.

4. A system as recited in claim 1 wherein the latex scratch-off ink has a thickness between about 0.01 mm and about 1 mm.

5. A system as recited in claim 1 wherein the substrate comprises at least one of paper, metal, or plastic.

6. A system as recited in claim 5 wherein the substrate comprises paper, the substrate further comprising a gloss finish.

7. A system as recited in claim 6, wherein the gloss finish is formed by application of an aqueous wash or coating to the substrate.

8. A system as recited in claim 1, wherein the dental tool comprises a tool for dispensing and burnishing a hemostatic composition into bleeding soft tissue.

9. A system as recited in claim 8, wherein the scratch-off material is configured to be removed from the substrate upon application of a minimum magnitude of pressure that is substantially equal to a pressure to be applied during application of a hemostatic composition to bleeding soft tissue in order to arrest bleeding.

10. A system as recited in claim 1, wherein the substrate comprises at least one of a card, a brochure, a page of a pamphlet, or a page of a book.

11. A system as recited in claim 10, wherein the substrate comprises a tri-fold brochure.

12. A method for training dental practitioners in use of a selected dental tool comprising:
    providing a system as recited in claim 1;
    instructing a dental practitioner to apply pressure to the coating of scratch-off material which is sufficient in magnitude so as to remove the coating of scratch-off material, and wherein a minimum magnitude of pressure required to remove the coating of scratch-off material is substantially equal to a pressure to be applied during a dental procedure that is a subject of the training method.

13. A method as recited in claim 12, wherein the dental tool comprises a tool for dispensing and burnishing a hemostatic composition into bleeding soft tissue.

14. A method as recited in claim 13, wherein the scratch-off material is removed from the substrate upon application of the minimum magnitude of pressure that is substantially equal to a pressure to be applied during application of a hemostatic composition to bleeding soft tissue in order to arrest bleeding.

15. A method as recited in claim 12, wherein the substrate comprises at least one of a card, a brochure, a page of a pamphlet, or a page of a book.

16. A method as recited in claim 15, wherein the substrate comprises a tri-fold brochure.

17. A system for instructing a dental practitioner relative to an appropriate magnitude of pressure to be applied during application of a hemostatic composition to bleeding soft tissue in order to arrest bleeding, the system comprising:
    a dental tool for dispensing and burnishing a hemostatic composition into bleeding soft tissue; and
    a substrate including a coating of scratch-off material adhered to at least a portion of the substrate, the scratch-off material having an adherence strength to the substrate that is specifically configured so that the scratch-off material is removable from the substrate using the dispensing and burnishing tool upon application of a threshold minimum pressure that is substantially equal to a pressure to be applied during application and burnishing of a hemostatic composition into bleeding soft tissue in order to arrest bleeding.

18. A system as recited in claim 17, wherein the coating of scratch-off material comprises a latex based scratch-off ink.

19. A system as recited in claim 17, wherein the latex scratch-off ink has a thickness between about 0.01 mm and about 1 mm.

20. A system as recited in claim 17, wherein the substrate comprises paper, the substrate further comprising a gloss finish.

* * * * *

UNITED STATES PATENT AND TRADEMARK OFFICE
CERTIFICATE OF CORRECTION

PATENT NO.        : 8,608,482 B2
APPLICATION NO.   : 13/184051
DATED             : December 17, 2013
INVENTOR(S)       : Fischer et al.

It is certified that error appears in the above-identified patent and that said Letters Patent is hereby corrected as shown below:

<u>Title Page</u>
Item (12), First named inventor, change "Fishcer" to --Fischer--
Item (75), Inventors, change "Dan E. Fishcer" to --Dan E. Fischer--
Item (75), Inventors, change "Gustavo de Mattos Abreu" to --Luis Gustavo de Mattos Abreu--

Signed and Sealed this
Sixth Day of May, 2014

Michelle K. Lee
*Deputy Director of the United States Patent and Trademark Office*